No. 754,802. PATENTED MAR. 15, 1904.
F. PORSCHE & L. LOHNER.
STEERING DEVICE FOR MOTOR VEHICLES.
APPLICATION FILED JULY 8, 1902.
NO MODEL.
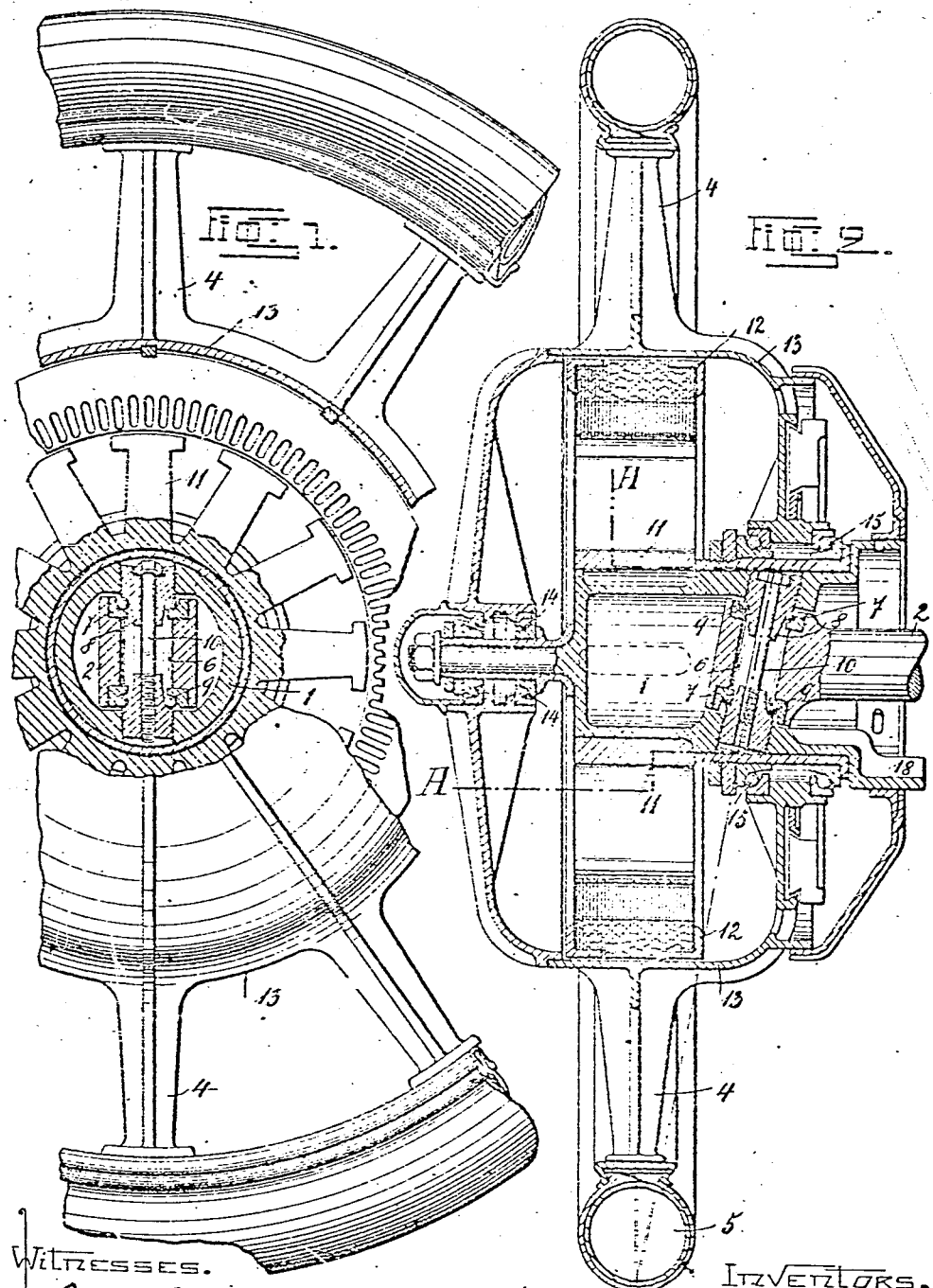

No. 754,802.

Patented March 15, 1904.

UNITED STATES PATENT OFFICE.

FERDINAND PORSCHE AND LUDWIG LOHNER, OF VIENNA IX, AUSTRIA-HUNGARY.

STEERING DEVICE FOR MOTOR-VEHICLES.

SPECIFICATION forming part of Letters Patent No. 754,802, dated March 15, 1904.

Application filed July 8, 1902. Serial No. 114,801. (No model.)

*To all whom it may concern:*

Be it known that we, FERDINAND PORSCHE, engineer, residing at Berggasse 6, and LUDWIG LOHNER, manufacturer, residing at Porzellangasse 2, Vienna IX, Austria-Hungary, subjects of the Emperor of Austria-Hungary, have invented certain new and useful Improvements in or Relating to Steering Devices for Motor Road-Vehicles; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

In motor road-vehicles in which each of the two steering-wheels is provided with a separate motor—for instance, with an electromotor-hub—and is therefore driven independently, there is the drawback that the driving force acting on the surface of contact between the wheel and the ground is accompanied by a torsional moment with regard to the pivot about which the wheel, together with its axle, turns. This torsional moment is especially of great disadvantage when one of the motors upon the car traveling at a high speed ceases to act, so that only one wheel is driven. In this case the torsional moment of the motor which remains in action had the tendency to turn the wheel about the pivotal connection with the main axle and to drive the vehicle in quite a different direction than it had before, whereby frequently accidents are caused.

According to the present invention the axle is connected with the wheel-journal by a pivot, which is so arranged as to bring it in direct alinement with the bearing or road-contact point of the wheel, so that torsional moment of self-propelled wheels is thus overcome, compactness and the protection of the parts forming the pivot and other advantages being attained by making the said journal hollow and inclosing the said pivot within it.

In the accompanying drawings the invention is shown as applied to electrically-driven wheels.

Figure 1 is a section on the line A A of Fig. 2, while Fig. 2 is a longitudinal section through the axle.

The wheel-journal 1, which may be made hollow, is connected to the main axle 2 by means of a pivot, the axle of which passes through the point of contact between the road-wheel 4 or its pneumatic tire 5 and the road. In the constructional form shown the end of the axle 2 is provided with an inclined hole 6, the enlarged end portions of which are provided with bearing-sockets 7, receiving balls 9, against which bear conical plugs or parts 8, constituting the wheel-pivots and screwed into the hollow portion of journal 1. The pivots 8 are, moreover, preferably connected by a bolt 10, whereby an increased security and rigidity are obtained. The journal 1 carries fixed to it field-magnets 11, while the hub-casing 13, carrying the armature, revolves on ball-bearings 14 15. The field-magnets are thus stationary, while the armature, and in consequence the wheel connected to the armature, rotates. The current may be supplied by sliding brushes 16, which are protected against external influence by a cover 17.

The operation is as follows: Each journal carrying a wheel forms a two-armed lever, to the inner arm of which the steering device is connected between ribs 18 or the like, both wheels being simultaneously movable about their pivots. If only one wheel be driven, there will be no torsional movement with respect to the pivot, as the driving force acting on the periphery of the wheel is equal to zero. If the distance of the pivot from the middle plane of the wheel is comparatively small and the axis of the pivot passes exactly through the road-contact point of the pneumatic tire, slight differences caused by the tire being more or less inflated will not affect the effectiveness of the described arrangement.

Having now particularly described and ascertained the nature of our invention and in what manner the same is to be performed, we declare that what we claim is—

1. The combination of the axle, the wheel, a hollow journal for the wheel, the end of the axle projecting into said journal, and a pivotal connection between the axle and journal having its axial line disposed acutely to the plane of the wheel, substantially as described.

2. The combination of the axle, the wheel, a hollow journal for the wheel, the end of the axle projecting into said journal, alined cones screwed into said journal and forming a pivotal connection between the axle and the journal, and a bolt connecting said cones, substantially as described.

In testimony that we claim the foregoing we have hereunto set our hands this 24th day of June, 1902.

FERDINAND PORSCHE.
LUDWIG LOHNER.

Witnesses:
ALVESTO S. HOGUE.
FEROZ REITLY.